(12) United States Patent
Trefler et al.

(10) Patent No.: US 7,711,919 B2
(45) Date of Patent: *May 4, 2010

(54) METHODS AND APPARATUS FOR DIGITAL DATA PROCESSING WITH MUTABLE INHERITANCE

(75) Inventors: Alan Trefler, Brookline, MA (US); Andreas G. Hofmann, Cambridge, MA (US)

(73) Assignee: Pegasystems Inc., Cambridge, MA (US)

( * ) Notice: Subject to any disclaimer, the term of this patent is extended or adjusted under 35 U.S.C. 154(b) by 1246 days.

This patent is subject to a terminal disclaimer.

(21) Appl. No.: 11/203,513

(22) Filed: Aug. 12, 2005

(65) Prior Publication Data

US 2006/0041861 A1 Feb. 23, 2006

Related U.S. Application Data

(63) Continuation of application No. 10/430,693, filed on May 6, 2003, now Pat. No. 6,976,144.

(51) Int. Cl.
*G06F 12/00* (2006.01)
(52) U.S. Cl. .................................. 711/170; 707/103 R
(58) Field of Classification Search ........................ None
See application file for complete search history.

(56) References Cited

U.S. PATENT DOCUMENTS

| | | | |
|---|---|---|---|
| 4,344,142 A | 8/1982 | Diehr, II et al. | |
| 4,866,634 A | 9/1989 | Reboh et al. | |
| 4,930,071 A | 5/1990 | Tou et al. | |
| 5,136,523 A | 8/1992 | Landers | |
| 5,193,056 A | 3/1993 | Boes | |
| 5,204,939 A | 4/1993 | Yamazaki et al. | |
| 5,228,116 A | 7/1993 | Harris et al. | |
| 5,262,941 A | 11/1993 | Saladin et al. | |
| 5,267,175 A | 11/1993 | Hooper | |

(Continued)

FOREIGN PATENT DOCUMENTS

EP 1830312 9/2007

(Continued)

OTHER PUBLICATIONS

Anonymous "How SmartForms for Fair Blaze Advisor works", Fair Issac White Paper, http://www.FAIRISAAC.COM/, Oct. 31, 2005.

(Continued)

*Primary Examiner*—Hiep T Nguyen
(74) *Attorney, Agent, or Firm*—Nutter McClennen & Fish LLP; David J. Powsner

(57) ABSTRACT

A method of automated workflow processing includes transforming an object, A1, which is of class X, into an object which is of class Y. The method includes the steps of separating existing data elements of A1 from the object itself, generating new data elements corresponding to class Y, inserting the new data elements into object A1, and computing values for the new data elements, possibly based on values of the old data elements. Other objects that referred to A1 before the transformation continue to do so afterwards. Values of data elements prior to transformation can be preserved, e.g., to facilitate review, to facilitate further transformation, and/or to facilitate back transformation.

20 Claims, 10 Drawing Sheets

U.S. PATENT DOCUMENTS

| | | | |
|---|---|---|---|
| 5,276,885 A | 1/1994 | Milnes et al. |
| 5,291,583 A | 3/1994 | Bapat |
| 5,295,256 A | 3/1994 | Bapat |
| 5,297,279 A | 3/1994 | Bannon et al. |
| 5,379,366 A | 1/1995 | Noyes |
| 5,386,559 A | 1/1995 | Eisenberg et al. |
| 5,446,885 A | 8/1995 | Moore et al. |
| 5,473,732 A | 12/1995 | Chang |
| 5,504,879 A | 4/1996 | Eisenberg et al. |
| 5,542,024 A | 7/1996 | Balint et al. |
| 5,542,078 A | 7/1996 | Martel et al. |
| 5,561,740 A | 10/1996 | Barrett et al. |
| 5,596,752 A | 1/1997 | Knudsen et al. |
| 5,627,979 A | 5/1997 | Chang et al. |
| 5,630,127 A | 5/1997 | Moore et al. |
| 5,649,192 A | 7/1997 | Stucky |
| 5,815,415 A | 9/1998 | Bentley et al. |
| 5,819,257 A | 10/1998 | Monge et al. |
| 5,826,239 A | 10/1998 | Du et al. |
| 5,826,250 A | 10/1998 | Trefler |
| 5,875,334 A | 2/1999 | Chow et al. |
| 5,890,146 A | 3/1999 | Wavish et al. |
| 5,890,166 A | 3/1999 | Eisenberg et al. |
| 5,930,795 A | 7/1999 | Chen et al. |
| 5,995,948 A | 11/1999 | Whitford et al. |
| 6,023,704 A | 2/2000 | Gerard et al. |
| 6,085,198 A | 7/2000 | Skinner et al. |
| 6,105,035 A | 8/2000 | Monge et al. |
| 6,192,371 B1 | 2/2001 | Schultz |
| 6,338,074 B1 | 1/2002 | Poindexter et al. |
| 6,341,293 B1 | 1/2002 | Hennessey |
| 6,359,633 B1 | 3/2002 | Balasubramaniam et al. |
| 6,448,964 B1 | 9/2002 | Isaacs et al. |
| 6,493,754 B1 | 12/2002 | Rosborough et al. |
| 6,496,812 B1 | 12/2002 | Campaigne et al. |
| 6,502,239 B2 | 12/2002 | Zgarba et al. |
| 6,513,018 B1 | 1/2003 | Culhane |
| 6,526,440 B1 | 2/2003 | Bharat |
| 6,526,457 B1 | 2/2003 | Birze |
| 6,549,904 B1 | 4/2003 | Ortega et al. |
| 6,556,985 B1 | 4/2003 | Karch |
| 6,567,419 B1 | 5/2003 | Yarlagadda |
| 6,584,464 B1 | 6/2003 | Warthen |
| 6,629,138 B1 | 9/2003 | Lambert et al. |
| 6,636,850 B2 | 10/2003 | Lepien |
| 6,636,901 B2 | 10/2003 | Sudhakaran et al. |
| 6,661,908 B1 | 12/2003 | Suchard et al. |
| 6,678,882 B1 | 1/2004 | Hurley et al. |
| 6,684,261 B1 | 1/2004 | Orton et al. |
| 6,728,702 B1 | 4/2004 | Subramaniam et al. |
| 6,728,852 B1 | 4/2004 | Stoutamire |
| 6,748,422 B2 | 6/2004 | Morin et al. |
| 6,750,858 B1 | 6/2004 | Rosenstein |
| 6,756,994 B1 | 6/2004 | Tlaskal et al. |
| 6,772,350 B1 | 8/2004 | Belani et al. |
| 6,782,091 B1 | 8/2004 | Dunning, III |
| 6,829,655 B1 | 12/2004 | Huang et al. |
| 6,831,668 B2 | 12/2004 | Cras et al. |
| 6,839,682 B1 | 1/2005 | Blume et al. |
| 6,847,982 B2 | 1/2005 | Parker et al. |
| 6,851,089 B1 | 2/2005 | Erickson et al. |
| 6,856,575 B2 | 2/2005 | Jones et al. |
| 6,859,787 B2 | 2/2005 | Fisher et al. |
| 6,865,546 B1 | 3/2005 | Song |
| 6,867,789 B1 | 3/2005 | Allen et al. |
| 6,959,432 B2 | 10/2005 | Crocker et al. |
| 6,961,725 B2 | 11/2005 | Yuan et al. |
| 6,976,144 B1 | 12/2005 | Trefler et al. |
| 6,985,912 B2 | 1/2006 | Mullins et al. |
| 7,020,869 B2 | 3/2006 | Abrari et al. |
| 2001/0049682 A1 | 12/2001 | Vincent et al. |
| 2002/0091677 A1 | 7/2002 | Sridhar |
| 2004/0049509 A1 | 3/2004 | Keller et al. |
| 2004/0088199 A1 | 5/2004 | Childress et al. |
| 2004/0162822 A1 | 8/2004 | Papanyan et al. |
| 2005/0039191 A1 | 2/2005 | Hewson et al. |
| 2005/0165823 A1 | 7/2005 | Ondrusek et al. |
| 2005/0234882 A1 | 10/2005 | Bennett et al. |
| 2006/0041861 A1 | 2/2006 | Trefler et al. |
| 2006/0173724 A1 | 8/2006 | Trefler et al. |
| 2006/0218166 A1 | 9/2006 | Myers et al. |
| 2007/0028225 A1 | 2/2007 | Whittaker et al. |
| 2007/0233902 A1 | 10/2007 | Trefler et al. |
| 2007/0239646 A1 | 10/2007 | Trefler |

FOREIGN PATENT DOCUMENTS

| | | |
|---|---|---|
| EP | 1840803 | 10/2007 |
| WO | WO-0179994 | 10/2001 |
| WO | WO-0244947 | 6/2002 |
| WO | WO-2005010645 | 2/2005 |
| WO | WO-2005/117549 | 12/2005 |
| WO | WO-2005117549 | 12/2005 |

OTHER PUBLICATIONS

Busse, Ralph et al., "Declarative and Procedural Object Oriented Views", 1998, IEEE.

Cochrane, Roberta et al., "Integrating Triggers and Declarative Constraints in SQL", p. 567-578, Proceedings of the 22nd VLDB Conference Mumbai (Bombay), India, 1996.

Francisco, S. et al. "Rule-Based Web Page Generation" Proceedings of the 2nd Workshop on Adaptive Hypertext and Hypermedia, Hypertext'98, Jun. 24, 1998.

Kuhn, H.W. "The Hungarian Method for the Assignment Problem," Naval Research Logistics Quarterly, 2 (1955), pp. 83-97.

Manghi, Paolo et. al. "Hybrid Applications Over XML: Integrating the Procedural and Declarative Approaches", 2002 ACM.

Mecca, G. et al. "Cut and Paste", ACM, 1999.

Schiefelbein, Mark A Backbase Ajax Front-end for J2EE Applications, Internet Article, http:/dev2dev.bea.com/1pt/a/433>, Aug. 29, 2005.

B. Thuraisingham, "From Rules to Frames and Frames to Rules," AI Expert, pp. 31-39, Oct. 1989.

D. Burleson, "Adding behaviors to relational databases," DBMS, vol. 8(10), p. 68(5), Sep. 1995.

E. Bertino and P. Foscoli, "Index Organizations for Object-Oriented Database Systems," IEEE Trans. on Knowledge and Data Engineering, vol. 7(2), pp. 193-209, Apr. 1995.

F Maryanski, et al., "The Data Model Compiler: A Tool for Generating Object-Oriented Database Systems," 1986 Int'l. Workshop onObject-Oriented Database Systems, pp. 73-84, Sep. 1986.

H.A. Kuno and E.A. Rundensteiner, "Augmented Inherited Multi-Index Structure for Maintenance of Materialized Path Query Views," Proc. Sixth Int'l. Workshop on Research Issues in Data Engineering, pp. 128-137, Feb. 1996.

L.G. DeMichiel, et al., "Polyglot: Extensions to Relational Databases for Sharable Types and Functions in a Multi-Language Environment," Proc. Ninth Int'l. Conf. on Data Engineering, pp. 651-660, Apr. 1993.

M. Riccuiti, "Oracle 8.0 on the way with objects: upgrade will also build in multidimensional engine," InfoWorld, V. 17(39), p. 16, Sep. 1995 (abstract).

M. Stonebraker, "The Integration of Rule Systems and Database Systems," IEEE Trans. on Knowledge and Data Engineering, vol. 4(5), pp. 415-423, Oct. 1992.

P. Morizet-Mahoudeaux, "A Hierarchy of Network-Based Knowledge Systems," IEEE Trans. on Systems, Man, and Cybernetics, vol. 21(5), pp. 1184-1191, Sep. 1991.

S. Danforth, "Integrating Object and Relational Technologies," Proc. Sixteenth Annual Int'l. Computer Software and Applications Conf., pp. 225-226, Sep. 1992 (abstract).

S. Salvini and M.H. Williams, "Knowledge Management for Expert Systems," IEE Colloquium on 'Knowledge Engineering', 3 pages, May 1990.

T. Chan and W. Hwang, "Towards Integrating Logic, Object, Frame, and Production," Proc. Fourth Int'l. Conf. on Software Engineering and Knowledge Engineering, pp. 463-469, Jun. 1992.

T. Sellis, et al., "Coupling Production Systems and Database Systems: A Homogeneous Approach," IEEE Trans. on Knowledge and Data Engineering, vol. 5(2), pp. 240-256, Apr. 1993.

V.M. Markowitz and A. Shoshani, "Object Queries over Relational Databases: Language, Implementation, and Applications," Proc. Ninth Int'l. Conf. on Data Engineering, pp. 71-80, Apr. 1993.

W. Kim, "Object-Oriented Databases: Definition and Research Directions," IEEE Trans. on Knowledge and Data Engineering, vol. 2(3) pp. 327-341, Sep. 1990.

W. Sun, et al., "Supporting Inheritance in Relational Database Systems," Proc. Fourth Int'l. Conf. on Software Engineering and Knowledge Engineering, pp. 511-518, Jun. 1992.

Y.-M. Shyy and S.Y.W. Su, "Refinement Preservation for Rule Selection in Active Object-Oriented Database Systems," Proc. Fourth Int'l. Workshop on Research Issues in Data Engineering, pp. 115-123, Feb. 1994.

METHODS AND APPARATUS FOR DIGITAL DATA PROCESSING WITH MUTABLE INHERITANCE

This application is a continuation of U.S. patent application Ser. No. 10/430,693, filed May 6, 2003, now U.S. Pat. No. 6,976,144 entitled "Methods and Apparatus for Digital Data Processing With Mutable Inheritance," the teachings of which are incorporated herein by reference.

BACKGROUND OF THE INVENTION

The invention pertains to digital data processing and, more particularly, to methods and apparatus for implementation of object-oriented programming (OOP) objects. The invention has application, by way of non-limiting example, in the design and implementation of Business Process Management (BPM) systems, including, by way of non-limiting example, workflow applications The popularity of languages like C++ and Java, and of programming design methodologies like Booch and UML is, in large part, due to the object-oriented programming paradigm supported by these systems. Of late, these methodologies have been extended from more conventional programming languages to mark-up languages, such as XML, which permit ready definition of structured "documents" that are easily transmitted over networks (such as the Internet) and that can contain object-like data.

Objects are a very natural and intuitive way to model complex systems; they correspond closely to the way human domain experts think about a particular application. In general, objects typically correspond to "nouns"; the relevant things for a particular application. Attributes of the objects correspond to adjectives that provide details about the objects, and methods of the objects correspond to verbs that change the state of the object. This sort of correspondence supports rapid development of complex systems, often by individuals who are domain experts more than they are programmers.

An example domain area where the object-oriented paradigm has been used extensively is workflow applications, where work items, resources, and constraints are modeled as objects. Workflow applications typically require modeling complex business processes. Such modeling requires sophisticated data structures in order to adequately represent all the relevant information. Such applications are characterized by large numbers of classes, deep class hierarchies, and intricate links between associated object instances.

One important characteristic of workflow applications is that they are very dynamic; the information associated with a work item changes significantly as the work item is passed from operation to operation in the business process. Such information changes can be frequent, as the business process may be very detailed, and many enterprises have near real-time performance of such transactions as a goal.

Typically, a work item is represented using a very simple object that contains information like the work item's ID, its due time, etc. All other information, e.g., pertaining to the work item's ever-changing states, is represented in objects that are related to the work item. This is a perfectly valid approach under the object-oriented programming paradigm. However, it does lead to a lot of complexity as there may be a large number of objects related to the work item in intricate or indirect ways. This can present a problem for a programmer attempting to model the work item and the workflow of which it is a part.

In view of the foregoing, an object of this invention is to provide improved methods and apparatus for digital data processing and, more particularly, for example, for modeling and processing workflows.

A related object of the invention is to provide methods and apparatus for improved implementation of object-oriented programming (OOP) objects.

A further object is to provide such methods and apparatus as can be implemented in any variety of programming languages and/or on any variety of platforms.

A still further object is to provide such methods and apparatus as simply the modeling of workflows or other processes that utilize items of changing state.

SUMMARY OF THE INVENTION

The foregoing are among the objects attained by the invention which provides, in one aspect, methods of transforming an object, A1, which is of class X, into an object which is of class Y. The methods automatically maintains appropriate relations of object A1 with referring objects, so that those objects that referred to A1 before the transformation still refer to it afterwards. The methods further include updating of data attributes of A1 during the transformation, based on data attribute values before the transformation, and based on the class definitions of X and Y.

Such a method according to one aspect of the invention comprises instantiating an object A of class X by (i) allocating memory for a header of object A and (ii) allocating memory for one or more data elements inherited from class X that are associated with object A, and/or one or more method members inherited from class X and associated with object A. The method further includes responding to an object transformation request by allocating memory for one or more data elements inherited from of class Y which are absent from class X, and associating those data elements with said header of object A.

Related aspects of the invention provided such a method that includes the step of defining values for said data elements inherited from class Y as a function of any of one or more values of data elements of object A inherited from class X and/or one or more default values. A transformation function can be employed for generating values for the data elements inherited from class Y as a function of one ore more values for the data elements inherited from class Y as a function of one or more values of data elements of object A inherited from class X.

Such a transformation function can be implemented by utilizing procedural programming techniques. Alternatively, or in addition, it can be implemented using declarative rules—i.e., rules mapping from a set of input variables to an output variable. Thus, for example, a transformation function according to one aspect of the invention can include one or more such declarative rules, each of which provides a mapping from one or more data elements of object A from class X to a data element inherited from class Y.

Other aspects of the invention provide methods for automatically reclaiming memory originally allocated for data attributes of class X that are no longer needed after A1 is transformed into an object of class Y.

Still other aspects of the invention provide methods as described above in which class Y multiply inherits from classes $Y_0$-$Y_m$, where m is an integer greater than or equal to one. The object A1 is transformed into an instance of class $Y_0$ and, subsequently, modified to inherit from each of classes $Y_1$-$Y_m$ According to still other aspects of the invention, the class X multiply inherits from classes $X_0$-$X_n$, where n is an integer greater than or equal to 0). The method further includes removing from object A1 inheritance from any class $X_0$-$X_n$ that is not in $Y_0$-$Y_m$.

Further aspects of the invention provide methods of modeling workflow paralleling the above. According to these methods the class of an object corresponding to a work item is transformed, e.g., from Class X to Class Y, and so forth, in order to model changing states of the work item itself.

In other aspects, the invention provides a method of transforming an object A1 of class X to an object of class Y in which the values of data elements associated with object A1 prior to transformation are preserved. This preserved data can be employed for review purposes by a workflow architect (i.e., the business process management professional who models the workflow, e.g., using systems and methods according to the invention) or others. The preserved data can also be utilized to facilitate further transformations of object A1, e.g., from class Y to class Z. The preserved data can also be used for reverse transformations of the object. For example, in a reverse transformation of object A1 form class Y to class X, the preserved data can be employed to re-create original data values of A1 and/or to generate new such values, e.g., as combinations of the original values and the current values (i.e., those values that A1 has when it is of class Y).

These and other aspects of the invention are evident in the drawings and in the description that follows.

BRIEF DESCRIPTION OF THE ILLUSTRATED EMBODIMENT

A more complete understanding of the invention may be attained by reference to the drawings, in which FIG. 1 depicts a digital data processing system of the type with which the invention may be practiced;

Figure 4:
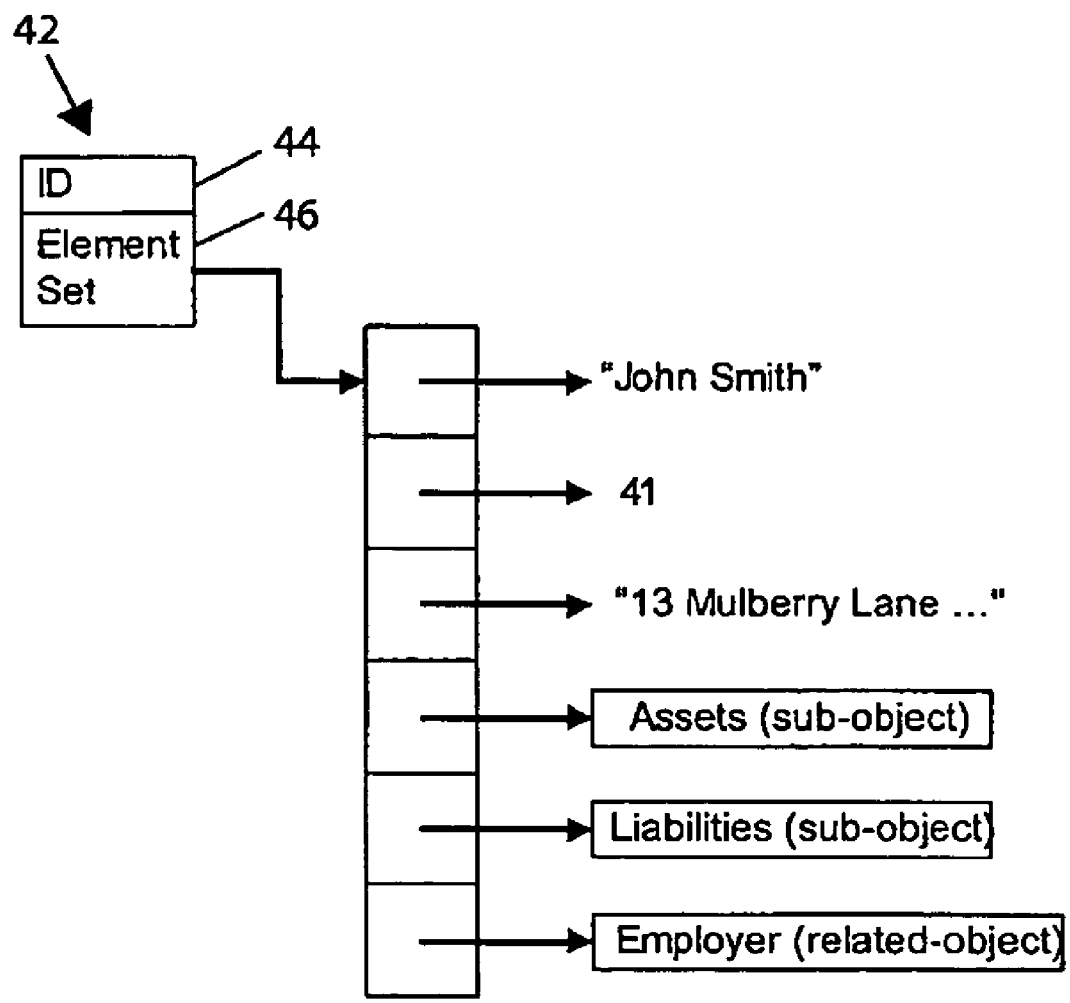

FIG. 4 schematically illustrates an exemplary object, and its associated element set, prior to a class transformation according to the teachings of the invention;

FIGS. 5-8 schematically illustrate steps utilized by an object transformation method of the invention for transforming the exemplary object of FIG. 4 from one class to another;

FIGS. 9-12 illustrate class hierarchies in workflow applications according to the invention;

DETAILED DESCRIPTION OF THE EMBODIMENT

Figure 1:
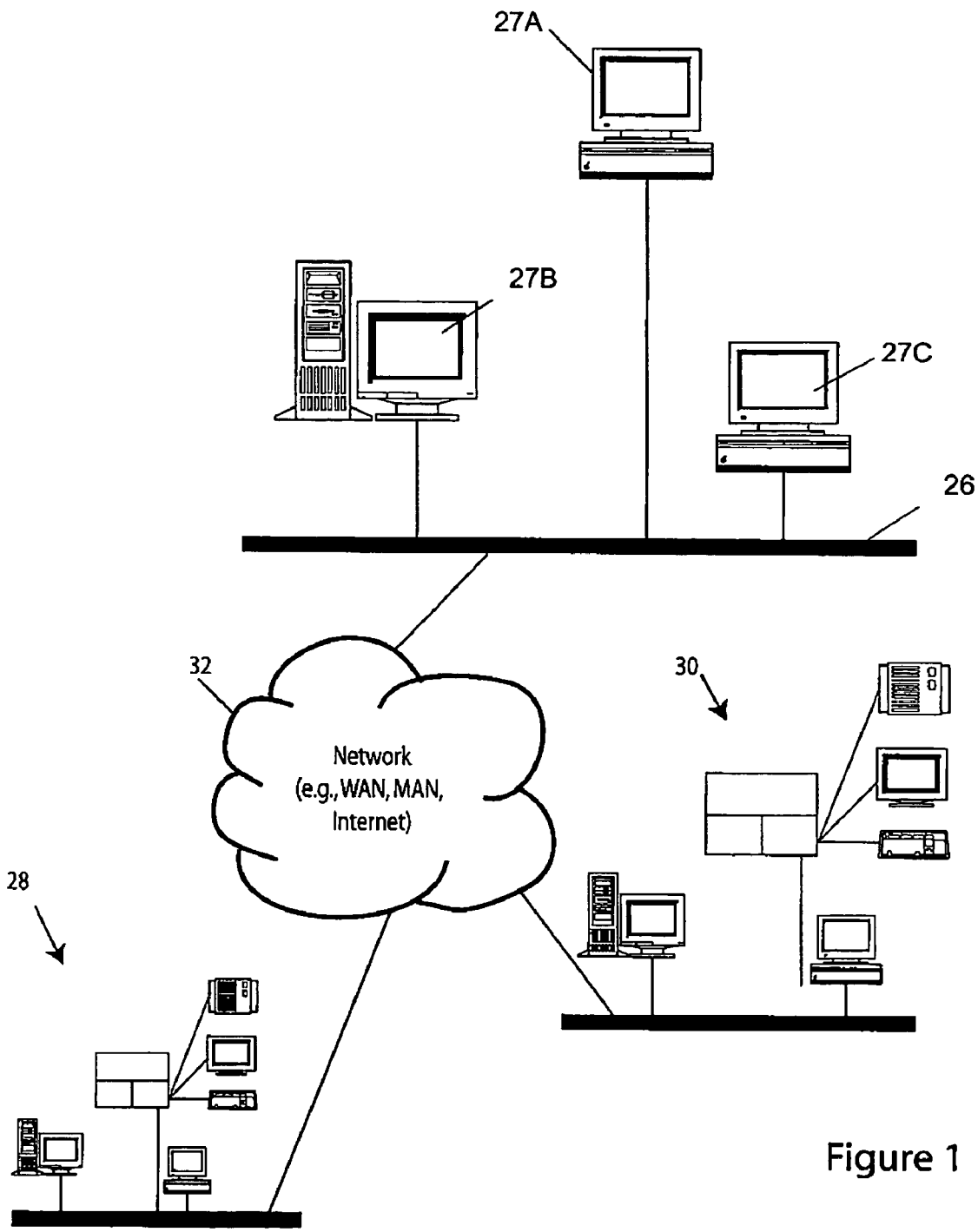

FIG. 1 depicts a digital data processing system of the type with which the invention may be practiced. The system includes one or more digital data processors, e.g., 27A-27C. These can be stand-alone units and/or networked units, as shown, that are coupled to one another and/or to other networked collections 28, 30 via a local area network (LAN) 26, wide area network (WAN), metropolitan area network (MAN) and/or Internet—the latter of which are collectively indicated by element 32. Digital data processors 27A-27C preferably comprise conventional commercially available personal computers, work stations, mainframes or other digital data processing systems of the type providing object-oriented programming (OOP) and/or runtime environments as necessary to support development and/or roll-out of the methods and apparatus described below.

Figure 2:
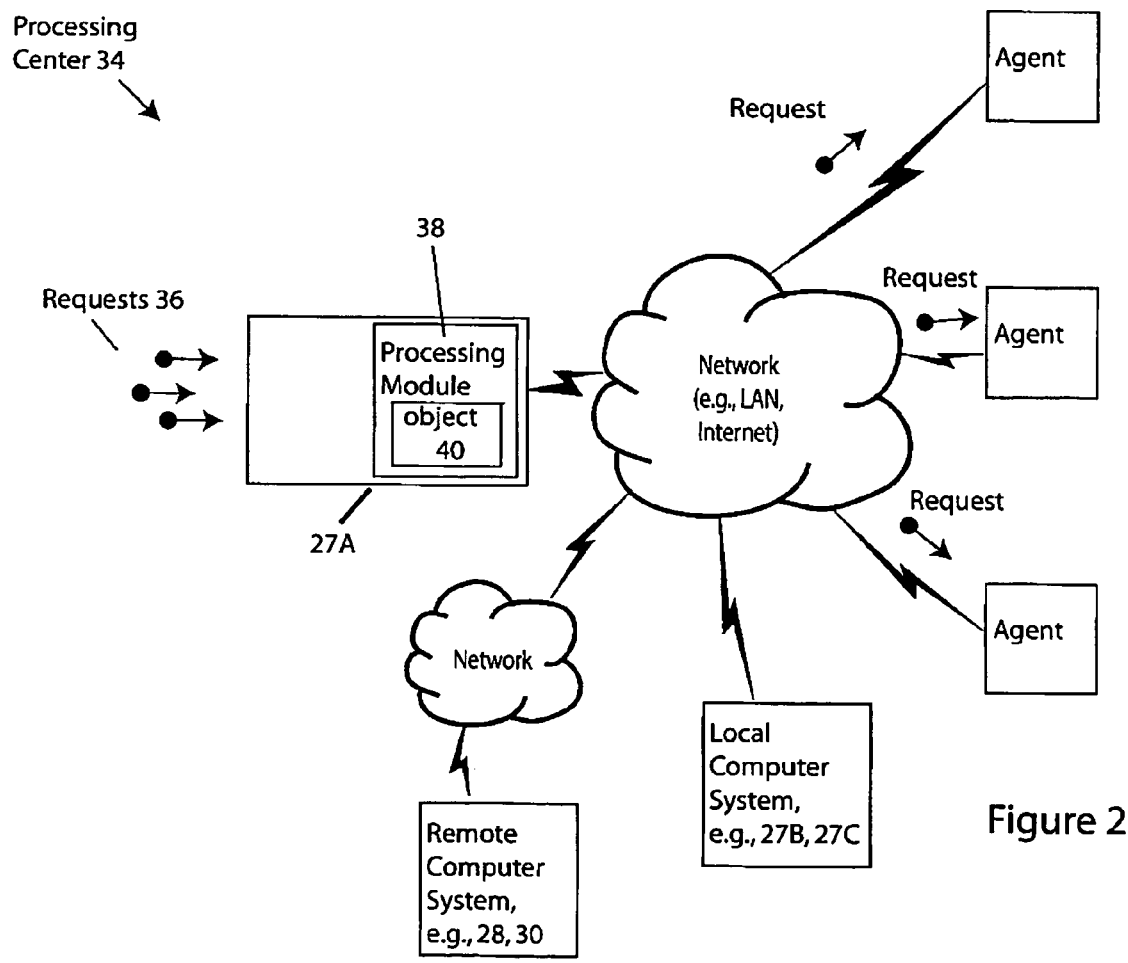
FIG. 2 depicts a digital data processing system providing a more particular environment of the type with which the invention may be practiced.

FIG. 2 depicts a digital data processing system providing a more particular environment of the type with which the invention may be practiced. Here, exemplary digital data processor 27A is employed in a processing center 34 or other environment and executes a workflow application—particularly, for routing work items Illustrated processing center 34 represents a service provider or other entity that utilizes work item routing. Non-limiting examples include retailers, mail order houses, professional service providers, counseling centers, and "help" bureaus, and so forth. While work item typically refers to tasks processed by the resources or to which resources may be allocated, as used herein the term refers to tasks, products, customer or other things for processing by the resources or to which resources may be allocated.

With continued reference to FIG. 2, the illustrated work items comprise customer requests 36 that require routing (or assignment) to employee-agents of the processing center 34. More generally, the illustrated agents represent any resource to which the "work items" may be allocated. This can include human resources, business resources, environmental resources, energy resources, consumable resources, or otherwise. The illustrated work items—here, customer requests—are subject to intake processing, e.g., by intake processing personnel and, then, are passed to digital data processor 27A for routing to the agents (or other resources).

Mutable Inheritance

Digital data processor 27A, as well as any other digital data processors in the illustrated embodiment or otherwise, implements OOP objects to model work items. One such object labeled as object 40, is shown by way of example in FIG. 2. The object 40 is defined, instantiated and used in the conventional manner known in the art, as modified in accord with the teachings below. That object 40 may be utilized in any module that forms part of the illustrated workflow application or in any other application. One such module, labeled as processing module 38, is shown by way of example in FIG. 2. Though the module 38 and the object 40 are referred to in the singular, it will be appreciated that one or more such modules and objects may be utilized in systems and method according to the invention. Moreover, though the discussion focuses on modeling of work items, it will be appreciated that the teachings hereof are applicable to other OOP objects, whether they model other entities or otherwise Illustrated object 40 changes class as the work item it models transitions from state to state during routing and/or processing by the service center 34. This permits the object 40 to efficiently accommodate additional or different information relevant to each state. For example, on intake, the module 38 may instantiate object 40 from a class Intake. The object inherits from that class data and method members necessary to model the intake process. This includes data members like customer I.D., problem description, etc., and method members like display_intake_screen, generate_routing, etc.

Once intake processing is completed, the object 40 is transformed to a class that reflects the specific type of the work item and that contains data and method members appropriate to its processing. This may be, for example, the class Service_Request that, too, has customer I.D. and problem description data members, but that also has a service technician I.D. and return authorization code data members. During transformation of the object 40, values for the first two members may be based on—e.g., copied or computed from—the same-named members of the prior class, while values for the new data members are assigned default values. The new data members may also take values based on data members of the prior class and/or on external data (e.g., data input from the user, records in a database, or otherwise). As a consequence of transformation, the object 40 also inherits method members appropriate to processing of a service request, like assign_service_technician, problem_knowledgebase_lookup, etc.

If the service request is resolved by the technician, the object 40 may be transformed to a Request_Satisfied class. This too might have customer I.D., service technician I.D. and problem resolution data members values which are copied, on transformation, from the Service_Request class object. It may also have a problem resolution data member. Method members inherited from the new class may include enter_problem_resolution and close-_matter, the former which facilitates entry of the problem resolution into a knowledge database and the latter which creates and archives entry for the object.

In the illustrated embodiment, each class from which a mutable object may be instantiated or otherwise inherit is provided with a method that is not known in the art and that is referred to here as a transformation constructor. As the object transforms from class to class, the constructor populates data members of each new class (the to class) based on values of corresponding variables from the prior class (the from class). Where necessary, the constructor also updates run-time references to the from class form of the object (i.e., references made by other runtime objects in the workflow application to the from class form of the object) to refer to the to class form.

The transformation constructor can be implemented as a method of the to class, taking as a parameter the object 40 (which is an instantiation of the from class). In alternative embodiments, the constructor is implemented as a member of the "from" class, taking as an input parameter an identifier of the to class and returning a pointer, variant object or otherwise representing the transformed object. Those skilled in the art will appreciate that "transformation" is merely label and that constructors named otherwise may be used instead. Moreover, those skilled in the art will appreciate that the functionality ascribed herein to the transformation constructor may, instead or in addition, be implemented in other method members of the subject object(s), in subroutines or functions, or otherwise.

Continuing the above example, transformation constructors provided for each of the Service_Request and Request_Satisfied classes can effect transformations of the object to each of those respective classes, as illustrated in the pseudo-code sequence below:

```
.
.
.
work item = new workitem("INTAKE");          // create object for new
work item.process( );                        intake work item
                                             // do intake processing
.
.
.
Service_Request::transform_object(workitem) // transform object
work item.process( );                        to "service
                                             request" class
                                             // do service
                                             request processing
```

-continued

```
.
.
.
Request_Satisfied::transform_object(workitem); // transform object
work item.process( );                           to "request
                                                satisfied" class
                                                // do satisfied
                                                request processing
.
.
.
```

Advantages of the illustrated embodiment are readily evident in the excerpt above. For example, notwithstanding that the object's type changes with each call to the transform_object method, it may continually be referred to in the source code by the same name—here, work item, Moreover, relevant data is carried forward with the object, even as it changes form. Still further, run-time references are automatically updated so that other runtime objects that referred to the from class form of the object refer to the to class form without need for source code intervention.

Rules for Determining Transformation Constructor

In a typical object-oriented programming language like Java or C++, when a method is called, the method definition code is found by searching the inheritance tree, beginning with the class for the instance on which the method is called, and walking up to successive super classes in the inheritance tree until the method definition is found. Thus, the most specific method defined for the instance will be used.

The situation is more complicated with a transformation constructor because there are two relevant classes: the current class of the object instance and the new class into which the instance will be transformed. To accommodate this, the transformation constructors use a table as defined below to determine a sequence of transformations in going from the current class to the new class:

|   | A | B | C | D | E | F |
|---|---|---|---|---|---|---|
| A |   | T-AtoB |   | T-BtoD |   |   |
| B |   |   |   |   |   |   |
| C |   |   |   |   |   |   |
| D |   | T-BtoD | T-DtoC |   |   |   |
| E |   |   | T-EtoC |   |   |   |
| F |   |   |   |   |   |   |

The rows of the table correspond to the "from" class, and the columns to the "to" class. The cells indicate the transform constructor definition, if there is one. The diagonal is always blank, as no transformation is necessary for going to the same class. Other cells may be blank as well, e.g., if transformation for that combination of "from" and "to" classes is not permissible.

Figure 3:
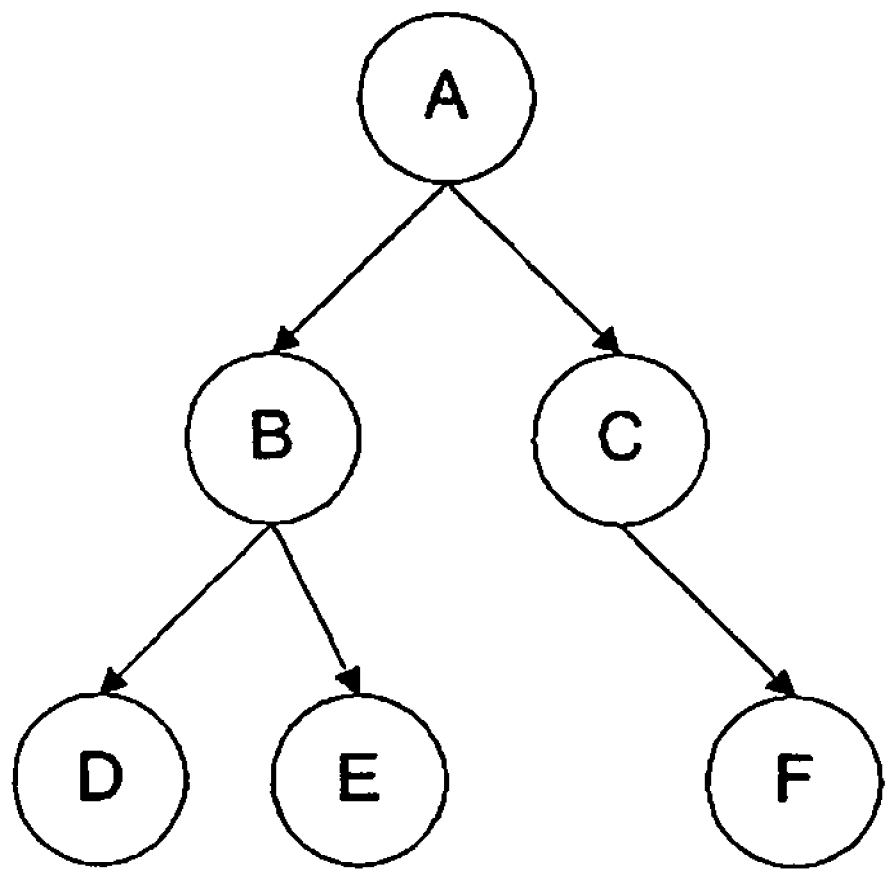
FIG. 3 depicts a class inheritance hierarchy traversed in a system according to the invention.

The table can be accessed directly by the transformation constructor source code—though, preferably, it is executed through code incorporated by a compiler or pre-compiler. Moreover, while the illustrated table is intended for use at runtime, other implementations may make use of such a table at compile time and/or may implicitly represent the table, e.g., in overloaded methods of the to and/or from classes.

Where there is an inheritance hierarchy among the classes identified in the table, e.g., as shown in FIG. 3, the transformation constructors traverse in order to find the most specific match. Such a hierarchy can be represented in tables generated by the compiler, runtime environment or otherwise in the usual manner. Traversal is also accomplished in the usual manner.

For example, suppose that the processing module 38 includes the call transform-instance (E1, "F")

where E1 is an instance of class E. The above table does not indicate a definition for a transform constructor from classes E to F, but it does indicate one for transformation from classes E to C. Since C is the parent of F in the class hierarchy (as shown in FIG. 3), it can be applied in a manner similar to the way that inherited methods are applied in ordinary object-oriented programming.

However, because two classes are involved, there is potential for confusion in determining the correct transform constructor to apply in a particular situation. For example, suppose that module 38 calls for transformation of object E1 (of class E) to an object of class F and no transform constructor is defined for E to F, but ones are defined from B to F, and from E to C. To determine which of these transformations to use, code included in the transformation constructors of the illustrated embodiment impose the following additional precedence rules: (1) when searching the class hierarchy for a transform constructor to apply, begin by searching up the class hierarchy from the from class; (2) use the most specific transform constructor found in this search that has a "to" class that is an ancestor of the required to class. Thus, the transformation from B to F is used.

Operation of the transformation constructors may be further appreciated by introducing a computational model that describes system behavior. Such a computational model is not specific to any implementation language; it specifies behavior and requirements for a more detailed implementation. The following description of the computational model is preceded by a set of definitions of common terms.

Summary Definition of Terms Commonly Used in Object-Oriented Programming

The following definitions are based on standards and conventions used in most popular object-oriented programming languages (such as Java or C++), but they do not suggest or require any specific implementation. These definitions will be used in the subsequent presentation of the computational model.

Class—a type specification for a structured data collection called an object. The type specification is represented as a set of elements. A class has a unique name that distinguishes it from other classes and objects.

Element—a class member that has a name as well as information associated with that name. There are two types of elements: data elements, and methods. A data element contains a data type specification, and a data value. For elements that are part of a class specification, this value is a default value (the initial value for the element when an object of the class is instantiated). A method element contains a reference to a function, as well as type specification information for the parameters of the function, and the values returned by the function.

Object—a structured data collection containing a set of elements, and some other information. An object is created (or instantiated) according to a specification from a particular class. A possible implementation of such an instantiation would be to simply copy the elements of the class to the object. An object maintains a reference to its associated class. An object is also given a unique name; its name is different from that of any other object, regardless of class. The object is given the name when it is instantiated. An object may also be deleted, at which time, its resources (memory used, and unique id) are recycled to pools from which they may be re-used.

Inheritance—A class may define its own elements. A class may also, optionally, have a superior class, from which it inherits elements. Thus, when an object of the class is instantiated, it will have elements defined by its associated class, as well as elements inherited from the class' superior class, if such a superior class exists. If an element defined for a class has the same name as an element inherited by the class, the element defined for the class is used, and the inherited element is ignored.

Multiple Inheritance—An extension of inheritance is multiple inheritance. Here, a class may have one, or possibly, multiple superior classes. The class inherits elements from all of these. Element name conflicts are resolved according to the order of specification of superior classes.

Computational Model

Data access and set methods

A class can be retrieved by using its name as a key.

An object can be retrieved by using its name as a key.

A data element of an object or class can be retrieved by using the object or class name, followed by the data element name. The two names are separated by the delimiter "."

Examples: person.height or FredSmith105.height

A data element of an object or class can be set using the "=" operator. The left side must be an element designation using class or object name followed by element name, as described above. The right side must contain a data value that is consistent with the type specification for the data element.

Method Invocation

A method is invoked using the object or class name, followed by the method element name. Parameters are provided within parentheses.

Example: Person.max (Fred.height, Joe.height)

Values returned by functions can be used to set data elements using the above-described syntax Example:
MyCompany.AnnualSales=MyCompany.Sum OverMonths (2002, "Sales")

Object Creation and Deletion

An object can be created (instantiated) using a global create method that takes, as parameters, the class and the name for the object. Optionally, data element name—value pairs can be included as parameters to this method for the purpose of initializing the named data elements to the values as long as these values are consistent with the class-specified data types for the data elements. Also, optionally, constructor methods that take zero or more arguments can be specified at the class level. The constructor methods are invoked after memory for the object is allocated, and its data elements are initialized to their default values.

An object can be deleted using a global delete method that takes, as parameter, the name of the object. When an object is deleted, its resources (allocated memory, and unique id) are recycled to pools from which they may be re-used. It is the responsibility of the developer to delete any outstanding references to this object (from other objects, for example).

Object Transformation

The capabilities described so far in connection with the above summary definitions are typical of most object-oriented programming systems. The following are transformation capabilities taught by the present invention:

Transform_object (<from_class>from_object)

Transform_object is a method that can be defined for any class. It is a "static" method in that it is associated with the class, and not with a particular instance. It takes a single parameter, namely, an object to be transformed. The method can be overloaded based on its signature (based on the from_ class). For example, SalesWorkItem.Transform_object (WorkItem WI_1)

is a method that converts an object of class WorkItem into an object of the more specific class SalesWorkItem. Similarly, TechSupportItem. Transform_object(WorkItem WI_1)

converts an object of class WorkItem into an object of class TechSupportItem. The transformation is often from a general class in an inheritance hierarchy to a more specific class, but this is not, necessarily always the case. For example, the following overloading of the Transform_object method for SalesWorkItem provides for transformation of a TechSupportItem into a SalesWorkItem.

SalesWorkItem.Transform_object (TechSupportItem WI_1)

This would be useful, for example, if the tech support department determines that the problem can be solved by buying a particular new component.

In preferred embodiments of the invention, a Transform_object method according to the teachings of the invention can perform the following computations for transforming an object of a given class to an object of a different class:

(a) In an initial step, the method generates a separate copy of the element set of the object to be transformed. This copy is bound to a local variable ("old_instance_element_set") whose scope is local to the Transform_object method. A local context is also set up so that, within the scope of the Transform_object method, elements from this set can be accessed using the syntax:old_instance.<element_name>. This also means that any rules invoked within the context of the Transform_object method can make such references. Note that in this embodiment "old_instance" is a reserved word.

To better illustrate the above step (a) performed by a Transform object method, consider an exemplary object 42, shown schematically in FIG. 4, having a header 44, which includes, among other attributes, an object identification field that contains information for uniquely identifying the object. In addition to the header 44, the exemplary object 42 further includes an element set 46 that contains a plurality of data elements and method members associated with the object 42. By way of example, the data elements associated with the object 42 can provide pointers, each index by an attribute name, that refer to selected data corresponding to a customer. For example, the illustrated data elements, which relate to a customer named "John Smith," provide information regarding the customer's age, address, assets, liabilities, and employer. The data elements indexed by attribute names Asset and Liabilities refer to sub-objects while the data element index by the attribute name Employer refers to a related object. It should be understood that a variety of data structures known in the art, e.g., arrays, linked lists, can be employed for representing the data elements associated with an object.

Figure 5:
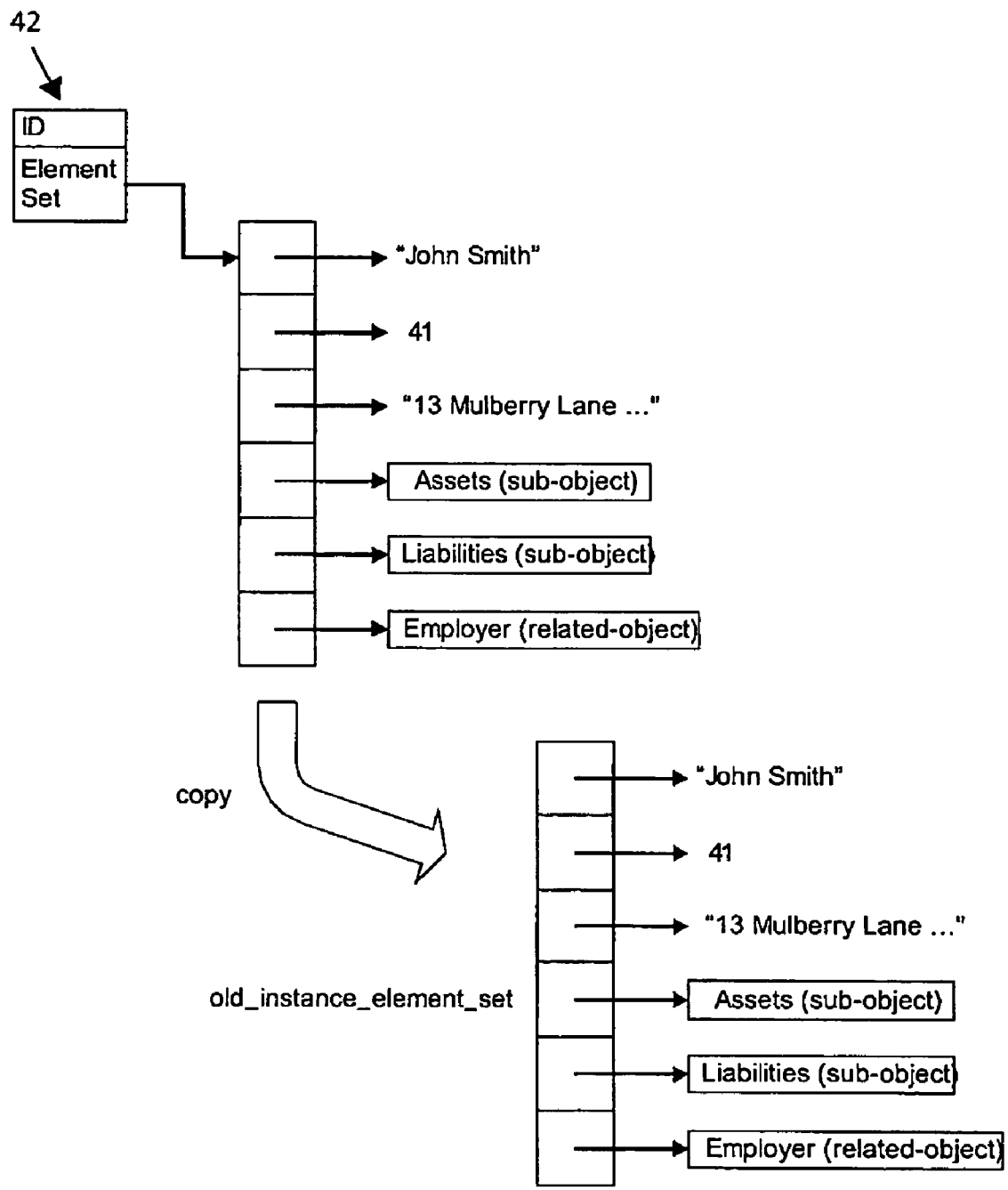

With reference to FIG. 5, a Transform_object method operating on the above exemplary object 42 generates a copy of the data elements associated with the object (sub-objects are copied while references to related objects, and not the related objects themselves, are copied), and binds the copy to the local variable old_instance_element_set.

(b) Subsequently, the Transform_object method reclaims memory allocated for the element set of the object to be transformed. In other words, the method deletes the element set of the object to be transformed, but not the object itself, and recycles memory allocated for this element set. Note, however, that the object itself is not deleted. In fact, it retains its name and its reference to its original class. Thus, references to it are still valid. The object simply happens to have an empty element set.

Figure 6:
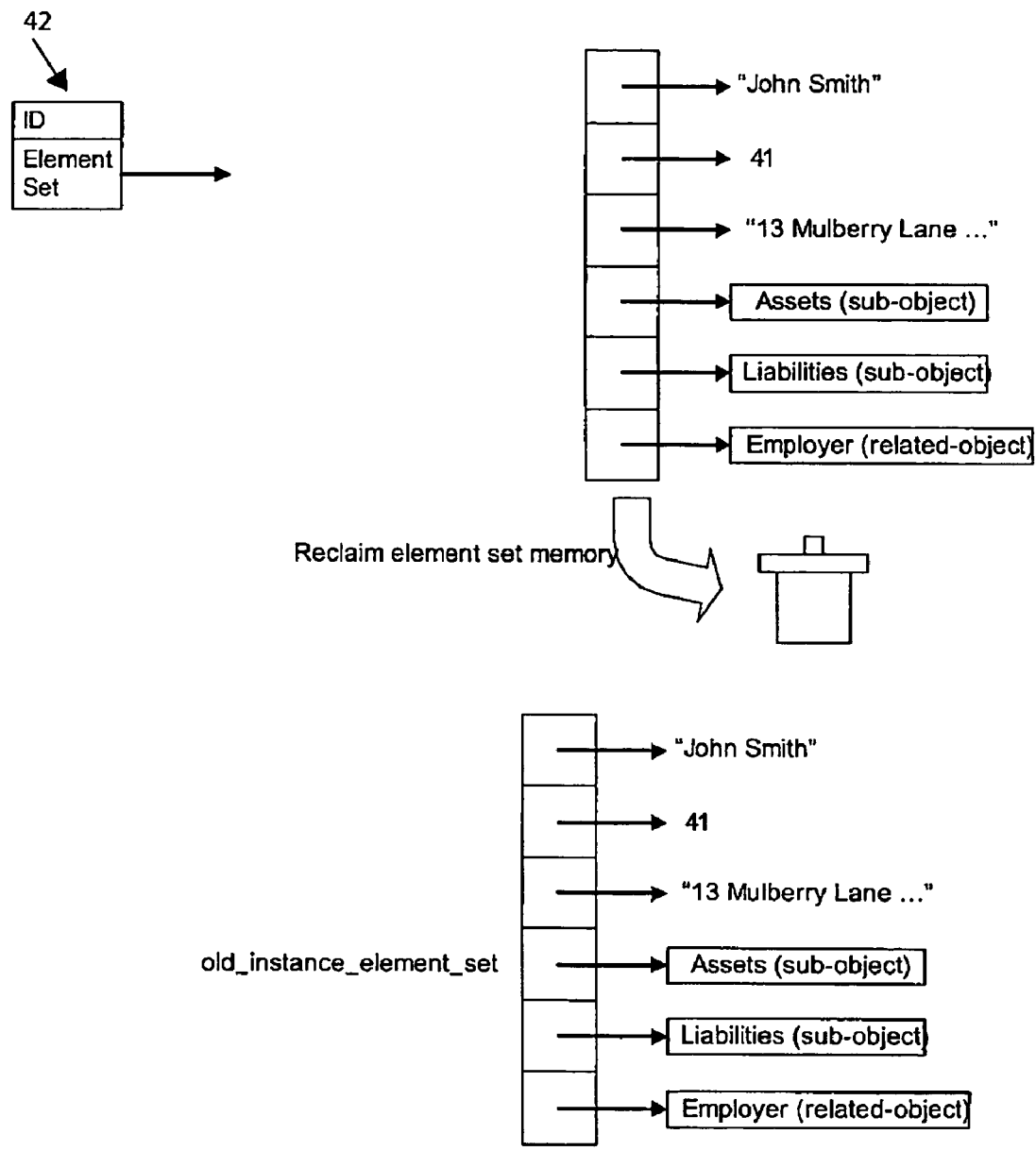

For example, with reference to FIG. 6, the memory associated with the original data elements of the above exemplary object 42 is reclaimed while the memory allocated for the object's header, and the association of the object with its header, are preserved.

(c) The Transform_object method then creates a new element set for instance based on a new class. The new element set can be created in exactly the same way as a new element set for a new object of the new class. For example, default values specified by the new class for selected data elements can be used. This element set can be bound to a local variable "new_instance_element_set" whose scope is local to the Transform_object method. A local context is also set up so that, within the scope of the Transform_object method, elements from this set can be accessed using the syntax:new_instance. <element_name>. This also means that any rules invoked within the context of the Transform_object method can make such references. Note that in this embodiment, "new_instance" is a reserved word.

Figure 7:
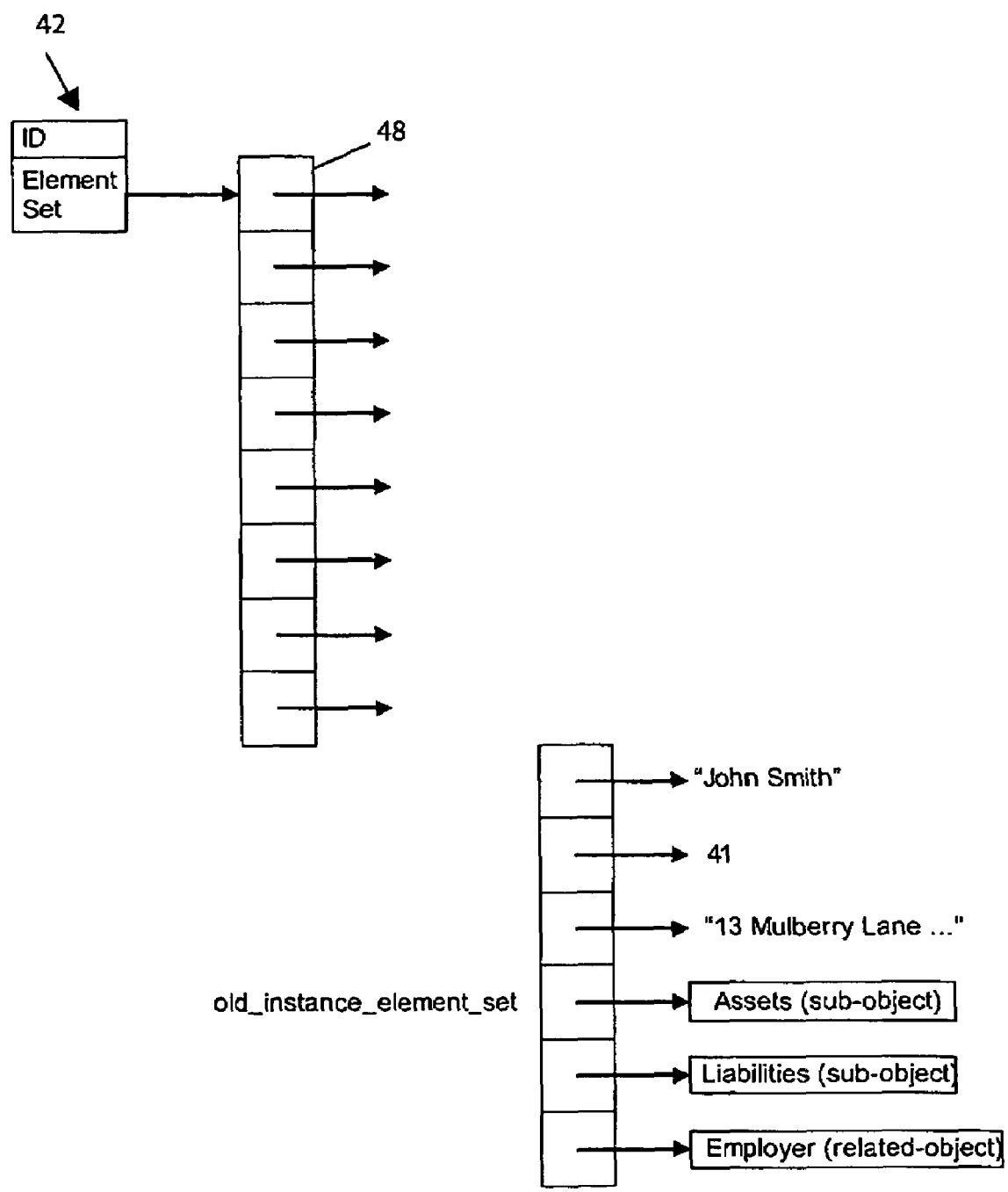

For example, referring to FIG. 7, in the case of the above exemplary object 42, the Transform_object method generates a new element set 48 and associates the object 42 with this new element set.

(d) The Transform_object method then executes workflow architect-defined code that forms the body of the method. Such code would typically use old_instance and new_instance references to assign appropriate data values to data elements of the new instance based on data values from appropriate data elements in the old instance. For example, typical data element transformations might be New_instance.priority=old_instance.priority or New_instance.expense=3 * old_instance.expense This would overide the default settings for priority and expense.

Figure 8:
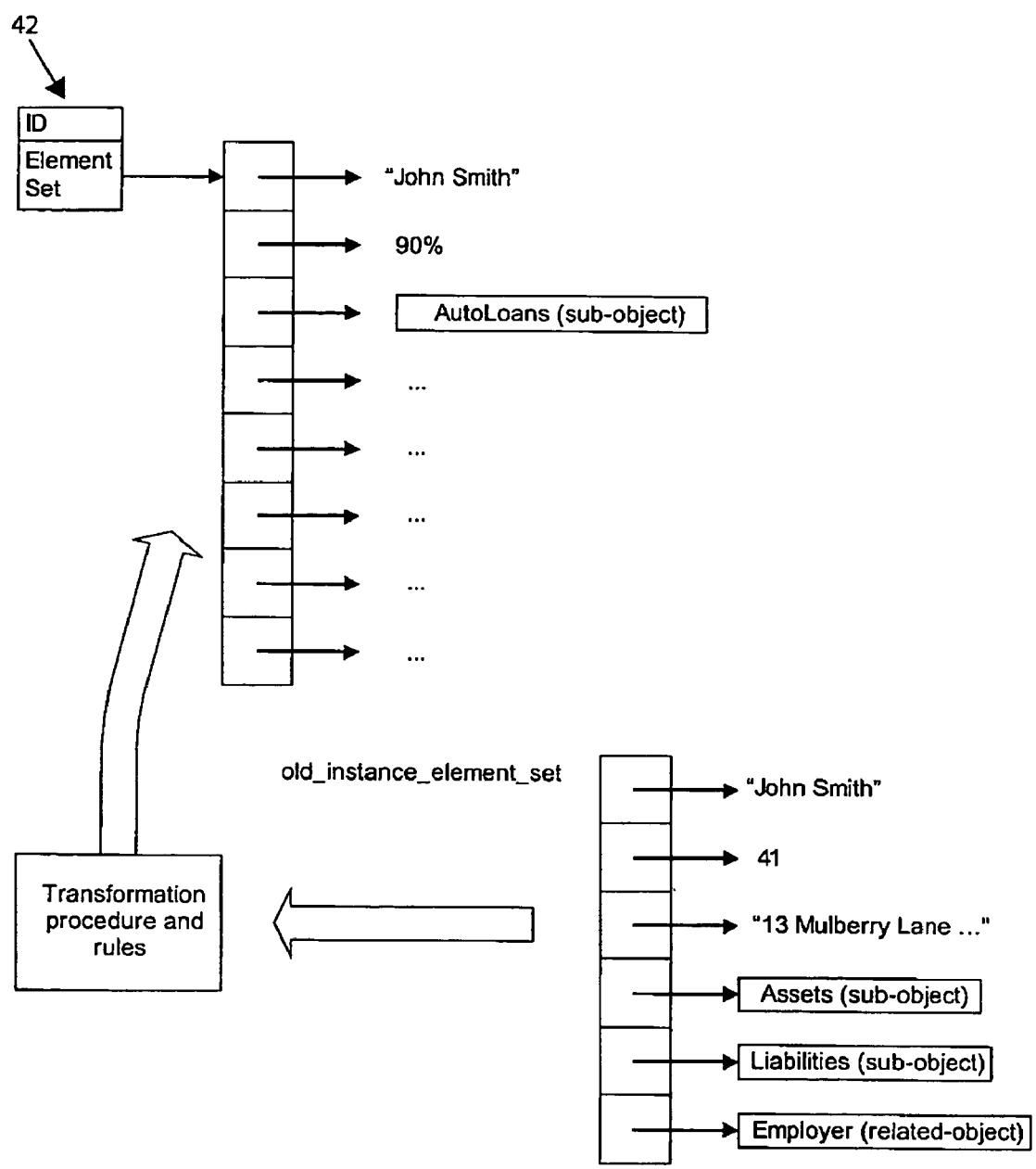

For example, referring to FIG. 8, the Transform_object method defines values for the new data elements associated with the above exemplary object 42 as a function of (a) one or more default values, or (b) one or more values of the copied data elements of object 42 inherited from the original class, which are bound to the local variable old_instance_element_ set. In some embodiments, a set of pre-defined transformation procedures and rules can be employed to define values of one or more new data elements as a function of the copied data elements.

(e) On exit, the Transform_object method can delete the element set referred to by the local variable old_instance_element_set. Memory used for this element set can then recycled.

There are a number of important differences between a transform-object method of the invention, as described above, and a copy constructor utilized in C++ or Java. For example, a transform-object method of the invention does not actually create a new object, even though it reclaims memory for the object's old data attributes, and allocates memory for the new ones. Also, a copy constructor in Java does not create an instance of a new class; it creates an instance of the same class as its argument.

In some embodiments of the invention, the values of data elements corresponding to an object of a class that is transformed are preserved to facilitate review (e.g., by the workflow architect), to facilitate further transformations, and/or to facilitate reverse transformations, e.g., transformation of a transformed object back to a previous class.

For example, the data values of an object of class A that is transformed into an object of class B can be preserved to facilitate transformation back from class B to class A. This allows information from a previous incarnation of an object, that is, data from an instance of the object corresponding to a previous class, to be re-used if it is transformed back into the previous class. Thus, suppose that class B does not include a superset of all properties of class A. In this case, a transformation of an object of class A to an object of class B can result in destruction of some data associated with the object prior to its transformation. In embodiments according to this aspect of the invention, that information is preserved.

By way of example, class A may represent "TechnicalSupportWorkItem", and class B may represent "SalesWorkItem". The transformation of "TechnicalSupportWorkItem" to "SalesWorkItem" may be effected by a technical support expert who may decide that a problem can be solved by buying a new component. Subsequently, it may, however, turn out that the new component is not available, or that it does not fix the problem, in which case, the SalesWorkItem is transformed back to a TechnicalSupportWorkItem. Here, the embodiment facilitates the transformation back to TechnicalSupportWorkItem by utilizing the original values and/or generating further values as a function of the original (preserved) and current values.

The preserved values can be employed in a direct or indirect back-transformations, e.g., from Class A to Class B and back to class A, or from class A to class B to class C and back to class A.

As described above, a transformation constructor has access to the element vector of an object that is being transformed (see FIGS. 5-8). Such access can be provided via a special variable "old instance", which can be, for example, a reserved word. Whereas in the embodiments described above, the element vector is destroyed after the transformation constructor is completed, in embodiments that support preserved data values, an element vector corresponding to a class of the object prior to transformation is preserved, e.g., cached. For example, rather than destroying an element vector associated with a class, the system binds it to a local variable, e.g., a variable named [class-name]PreviousInstance, and destroys any previous binding. The [class-name]PreviousInstance can, e.g., point to this preserved information vector for a class identified by the variable class-name.

This element vector can be utilized in a number of different ways. For example, when an instance of a present class is transformed back to an instance of a previous class, an element vector associated with the new instance of the previous class can be populated with values from the preserved element vector. Alternatively, it can be populated with default values, current values (i.e., values of the object instance prior to back-transformation), or a combined function of the preserved, default, and/or current values.

EXAMPLES

Figure 9:
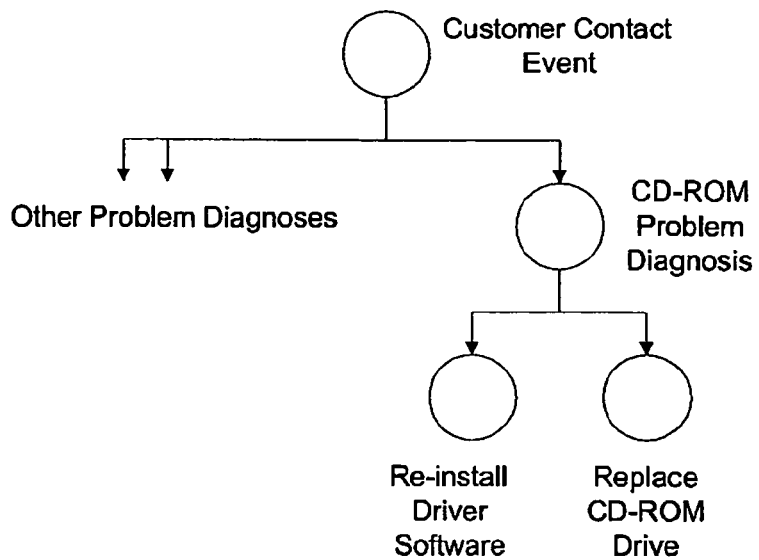
Figure 10:
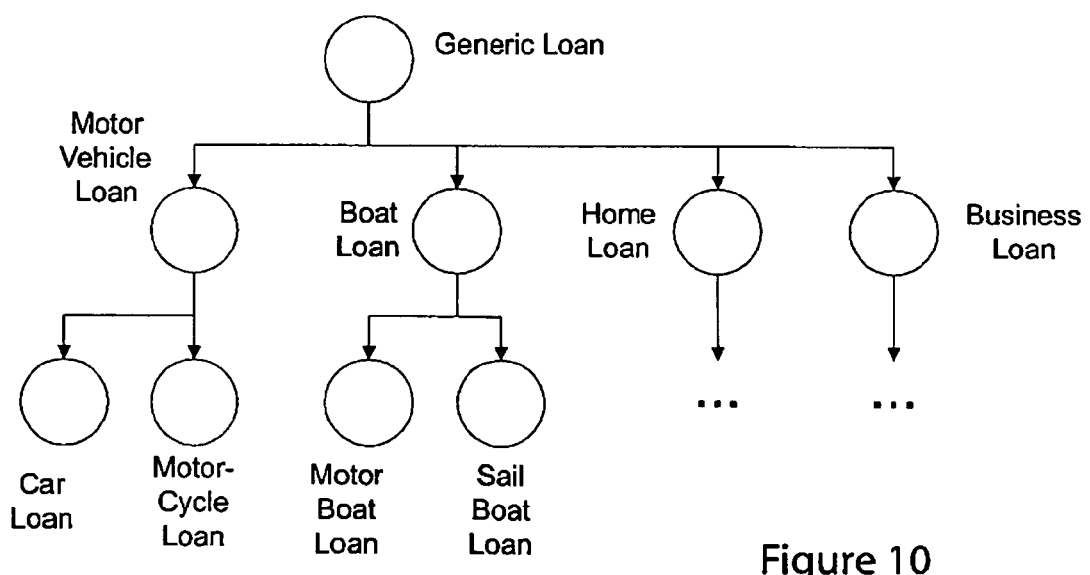

FIGS. 9-10 and the discussion below illustrate workflow applications utilizing a mutable object 40 as described above.

Example 1

Technical Support Call

Consider the class hierarchy illustrated in FIG. 9 modeling a work item as it moves through steps necessary to process a customer service call and, particularly, a technical support call. Initially, the object 40 modeling the work item is of class Customer Contact Event. This class has basic attributes and methods for collecting initial information about the customer and the nature of the problem. Once the nature of the problem is known, object 40 transforms into an instantiation of a class appropriate for diagnosing the problem. For example, if it becomes clear that the problem has to do with a CD-ROM, object 40 transforms into an instantiation of class CD-ROM Problem Diagnosis, which has methods for various tests and data attributes for representing test results. Once testing is complete, the object 40 transforms so that its class corresponds to the appropriate problem resolution operation, e.g., Re-install Driver Software or Replace CD-ROM Drive.

This example illustrates two aspects of typical workflows and the objects, e.g., object 40, used to model them: (a) information related to a work item grows monotonically as the work item moves from operation to operation in a business process; and (b) it is convenient to think of a work item becoming more and more "specialized" as it gains information by moving from operation to operation in a business process. Correspondingly, the object 40 begins as a generic class then transforms into successive subclasses.

Note also that transformation of object 40 from one class to another is useful when the two classes involved have significant overlap in their data attributes. This is the case when one class is a sub-class of the other (as in the above example) and is advantageous because it allows for much of the information in the original object to be retained through the transformation.

Example 2

Bank Loan

Now, consider the class hierarchy illustrated in FIG. 10 used to model business products, namely, bank loans, that are the subject of a business process, namely soliciting information from a customer about loan preferences.

To the processing center 34 agent or other resource (such as an automated web site wizard), as more information becomes available from or about the customer, it becomes clearer what product is best for the customer. Initially, all that is known is that the customer may be interested in a loan. At this stage, basic information about the customer (credit rating, net worth, income) and about the customer's needs are gathered in a newly instantiated object 40 of class Generic Loan. Later, it becomes clear to the agent or resource that the customer is interested in and/or qualifies for a motor vehicle loan. The object 40 correspondingly is transformed to the class Motor Vehicle Loan and, whence, to either class Motorcycle Loan or Auto Loan, depending upon further information gathered by the agent or resource.

As with the previous example, the object instance 40 transforms into a more specialized class as more information is gathered. Note, however, that whereas the hierarchy in the previous example was for work items, the hierarchy in this example is for products.

Example 3

Bank Customer

Figure 11:
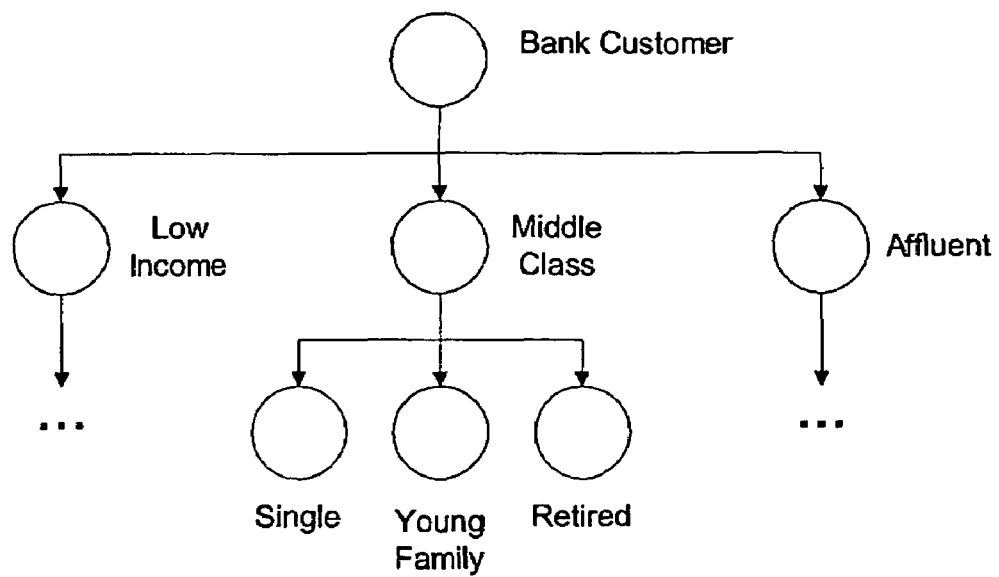

Consider the class hierarchy shown in FIG. 11 used to model the object or beneficiary of various business process—in this case, a bank customer. Here, object 40 is an instance of a Bank Customer class which transforms to one of the subclasses, e.g., Middle Class, as circumstances in the customer's life change. This example is for a longer-term business process than the ones in the previous examples. For such longer-term business processes, the processing module 38 and/or the application in which it is contained uses a conventional object oriented database or other means to persist the objects.

This example also illustrates that transformation is not necessarily always from a class to a sub-class; the transformations may have to be done across the class hierarchy. Consider, for example, the case where object 40, initially an instance of class Bank Customer has been changed to an instance of class Single. Suppose now, that customer that this object models gets married. The object 40 would then be transformed into a Young Family instance. Because this transformation is across the hierarchy, there is potentially less overlap of data attributes than there would be in a class-sub-class transformation. The corresponding transformation constructors, accordingly, may require more information than readily supplied by the prior object instance, thus, necessitating collection of data from the agent or other sources. Moreover, additional data transformations may be necessary, e.g., to map data from prior to current object instances. For example, the transformation from Young Family to Retired might involve a transformation of dependent children (of the Young Family instance) being transformed into adult children (of the Retired instance). Finally, note that whereas in the previous examples, the classes represented work items or products, in this example, they represent customers.

Mutable Multiple Inheritance

Multiple inheritance is a feature of a number of object-oriented programming languages. This feature allows for more than one parent of any class. Thus, instead of inheriting data and methods from a single class, it becomes possible for a class (and by extension, any instance of that class) to inherit from several classes. This feature is useful when modeling an object from several perspectives, each of which, may have a rich class hierarchy.

Figure 12:
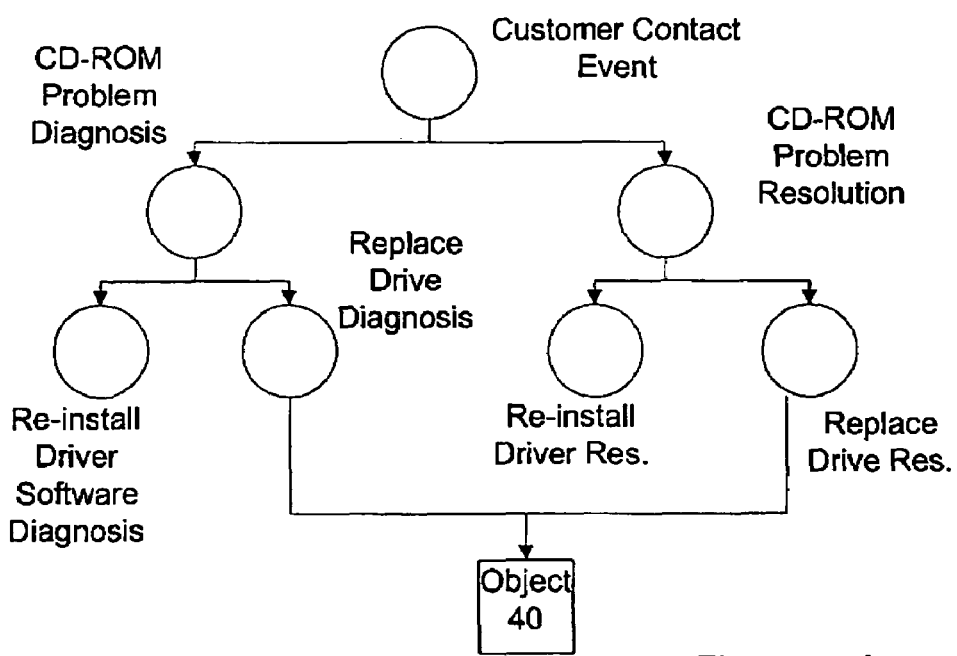

For example, in the technical support call application, it might be desirable to have two high-level classes: Problem-Diagnosis, and Problem-Resolution. Both of these inherit from the class Customer-Contact-Event. Problem-Diagnosis has data and method members concerning tests to perform. Problem-Resolution has data and method members concerning required resources and service call scheduling. These classes form part of a hierarchy as shown in FIG. 12. Illustrated object 40, e.g., modeling a work item for replacing a CD-ROM drive inherits from both Problem-Diagnosis and Problem-Resolution (and, more directly, from respective subclasses Replace-Drive-Diagnosis and Replace-Drive-Resolution). Similarly, in the bank customer application, it might be desirable to have one hierarchy for economic categorization and another representing customer interests and hobbies. An instance of a bank customer could then inherit from classes in both hierarchies.

Various object-oriented programming languages take different approaches to implementing multiple inheritance. C++ supports it directly. Java only supports single inheritance. However, a Java class can provide multiple Java interfaces which can be used to provide the illusion of multiple inheritance. In Java, the information from the additional parent classes is stored as related sub-objects and accessed via the interface methods. The interface can be given an appropriate signature so that, to the user of the class, it appears that it has inherited from other classes.

The illustrated embodiment supports object transformation in applications where an object 40 is the subject of the multiple inheritance case. Unlike single inheritance discussed above, transformation is no longer from one class to another because multiple classes are involved. Instead, each class from which a mutable object 40 may be instantiated or otherwise inherit is provided with an augmentation constructor, augmentation destructor, and transformation constructor, as defined below Augmentation Constructor
Parameters:
An instance, object-A, of class A, which may also inherit from classes A1 to An.
A class, class-B.
Effect:
Modifies object-A so that it now also inherits from class-B Augmentation Destructor
Parameters:
An instance, object-A, of class A, which may also inherit from classes A1 to An, and which also inherits from class-B
A class, class-B
Effect:
Modifies object-A so that it no longer inherits from class-B Transformation Constructor
Parameters:
An instance, object-A, of class A, which may also inherit from classes A1 to An
A class, class-B
A list of classes, B1 to Bm
Effect:
Transforms object-A into object-B, which has primary inheritance from class-B. Then calls augmentation constructor for object-B, for each of the classes B1 to Bm. It may also call the augmentation destructor methods for members of A1-AN that are not in B1-BM.

Using these operations, any instance that inherits from any combination of primary and secondary classes can be transformed into an instance that inherits from any other combination of primary and secondary classes. Note that the indexing (retrieval) of augmentation constructors is accomplished in a manner similar to that for transformation constructors.

Described above are methods and systems meeting the desired objects. It will be appreciated that the illustrated embodiment is merely an example of the invention and that other embodiments incorporating changes therein fall within the scope of the invention. Thus, it will be appreciated that the classes discussed in the preceding section are merely examples of how the invention is implemented, and that appropriate modifications to those examples might be employed for implementation in a variety of possible languages. Further, it will be appreciated that the transformation constructors shown in the above examples can be implemented in a variety of languages and, still, achieve the same benefit of easing modeling of workitems that are subject to transformation.

In view thereof, what we claim is:

1. In an execution environment for an object-oriented program, a method of manipulating objects, comprising
   instantiating an object A of class X, said instantiating step comprising
      allocating memory for a header of object A
      allocating memory for at least one of
         one or more data elements inherited from class X and associated with object A, and
         one or more method members inherited from class X and associated with object A,
      allocating memory for one or more data elements inherited from of class Y which are absent from class X, and
      associating those data elements with said header of object A.

2. In the execution environment of claim 1, the further improvement comprising
   defining values for said data elements inherited from class Y as a function of any of (a) one more values of data elements of object A inherited from class X, and (b) one or more default values.

3. The method of claim 2, further comprising disassociating from said header any of said data elements inherited class X which are absent from class Y.

4. The method of claim 3, further comprising associating the header of object A with one or more method members inherited from class Y that are absent from class X.

5. The method of claim 3, further comprising dissociating from object A one or more method members inherited from X that are absent from class Y.

6. The method of claim 4, wherein said object transformation request comprises a request for invocation of a method member of object A.

7. The method of claim 5, wherein said object transformation method is a method member of object A inherited from class Y.

8. The method of claim 3, further comprising the step of generating a copy of the data elements of object A inherited from class X and utilizing said copied data elements in the step of defining values of said data elements inherited from Y.

9. The method of claim 2, comprising reclaiming memory for said dissociated data elements inherited from X.

10. The method of claim 5, wherein said object transformation method is a constructor method of object A inherited from class Y.

11. The method of claim 6, comprising identifying class Y upon invocation of a method member of object A.

12. The method of claim 3, comprising identifying class X upon invocation of a method member of object A.

13. A method for transforming an object A of class X, which inherits data elements and method members from class X, into an object of class Y, comprising
   allocating memory for one or more data elements and method members inherited from Y,
   associating object A with said allocated data elements inherited from Y and with one or more method members inherited from Y, and
   defining values for said allocated data elements inherited from Y as a function of any of (a) one or more values of data elements of object A inherited from class X, or (b) one or more default values, and
   dissociating object A from said data elements and method members inherited from class X.

14. The method of claim 13, comprising copying values of data elements of object A inherited from class X and utilizing said copied values in the step of defining values of the data elements inherited from Y.

15. The method of claim 14, wherein the step of defining values comprises assigning to any data element of class Y present in class X a value associated with that data element in object A inherited from class X.

16. The method of claim 15, wherein the step of defining values comprises assigning to any data element of class Y absent from class X, any of (a) default values or (b) values based on a function of one or more values of data elements of object A inherited from class X.

17. A method of transforming an object A of class X, which inherits one or more data elements and one or more method members from class X, into an object that is of class Y, comprising the steps of:
   generating one or more data elements inherited from class Y absent from class X,
   associating object A with said generated data elements inherited from class Y, and
   associating object A with one or more method members inherited from Y absent from class X.

18. The method of claim 17, further comprising defining values for said generated data elements inherited from Y as a function of any of (a) one or more values of the data elements of object A inherited from class X, or (b) one or more default values.

19. The method of claim 17, wherein the step of associating object A with said generated data elements comprises associating a header of object A with said generated data elements inherited from Y.

20. A method of transforming an object A of class X, which inherits from class X one or more data elements and one or more method members, into an object that is of a class Y, comprising the steps of
   disassociating from object A one or more data elements inherited from class X that are absent from class Y, and
   disassociating from object A one or more method members inherited from class X that are absent from class Y.

* * * * *